United States Patent
Huang et al.

(10) Patent No.: US 12,512,945 B2
(45) Date of Patent: Dec. 30, 2025

(54) INDICATION INFORMATION TRANSMISSION METHOD AND COMMUNICATION DEVICE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 333 days.

(21) Appl. No.: 17/788,956

(22) PCT Filed: Dec. 25, 2020

(86) PCT No.: PCT/CN2020/139190
§ 371 (c)(1),
(2) Date: Jun. 24, 2022

(87) PCT Pub. No.: WO2021/129768
PCT Pub. Date: Jul. 1, 2021

(65) Prior Publication Data
US 2023/0024879 A1     Jan. 26, 2023

(30) Foreign Application Priority Data
Dec. 26, 2019 (CN) .......................... 201911366591.3

(51) Int. Cl.
*H04L 5/00* (2006.01)

(52) U.S. Cl.
CPC .................. *H04L 5/0053* (2013.01)

(58) Field of Classification Search
CPC ....... H04L 5/0094; H04L 5/005; H04L 5/001; H04L 5/0092; H04L 5/0048;
(Continued)

(56) References Cited

U.S. PATENT DOCUMENTS

2012/0020288 A1   1/2012   Liu
2012/0269143 A1   10/2012  Bertrand
(Continued)

FOREIGN PATENT DOCUMENTS

CN    107733496 A    2/2018
CN    108111253 A    6/2018
(Continued)

OTHER PUBLICATIONS

International Search Report for PCT/CN2020/139190 issued on Mar. 24, 2021, and its English translation provided by WIPO.
(Continued)

*Primary Examiner* — Mahran Y Abu Roumi
(74) *Attorney, Agent, or Firm* — Ladas & Parry, LLP

(57) ABSTRACT

The present disclosure provides an indication information transmission method and a communication device. The method includes: transmitting an indication information, the indication information includes one or more of the following: sounding reference signal (SRS) resource indication information, precoding matrix indication information, number of transmission layers indication information and antenna panel indication information; at least one of the indication information included in the indication information is sub-band indication information.

12 Claims, 2 Drawing Sheets

(58) Field of Classification Search
CPC .... H04L 5/0044; H04L 5/0051; H04W 72/23; H04W 72/231; H04W 72/046; H04W 72/02; H04W 72/0453; H04B 7/0456; H04B 7/0404; H04B 1/713
See application file for complete search history.

(56) References Cited

U.S. PATENT DOCUMENTS

| | | | | |
|---|---|---|---|---|
| 2019/0173607 | A1* | 6/2019 | Liu | H04L 1/0003 |
| 2020/0195330 | A1 | 6/2020 | Huang et al. | |
| 2021/0044400 | A1* | 2/2021 | Jiang | H04L 5/0048 |
| 2022/0345266 | A1* | 10/2022 | Zheng | H04L 5/001 |
| 2023/0208588 | A1* | 6/2023 | Hao | H04L 5/0044 370/329 |

FOREIGN PATENT DOCUMENTS

| | | |
|---|---|---|
| CN | 108111283 A | 6/2018 |
| CN | 108260160 A | 7/2018 |
| CN | 109152035 A | 1/2019 |
| CN | 110545168 A | 12/2019 |

OTHER PUBLICATIONS

Written Opinion for PCT/CN2020/139190 issued on Mar. 24, 2021, and its English translation provided by WIPO.

International Preliminary Report for PCT/CN2020/139190 issued on Jun. 28, 2022 and its English translation provided by WIPO.

First Office Action and search report for Chinese Patent Application 201911366591.3 issued on Nov. 25, 2021, and its English translation provided by the Chinese Patent Office.

"Research on Key Technologies of Long Term Evolution Wireless Systems", Yan Lin, Mar. 2011, PhD dissertation, Beijing University of Posts and Telecommunications, with English translation provided by Google.

Extended European Search Report for the corresponding European Patent Application No. 20906943.4 issued by the European Patent Office on Nov. 13, 2023.

"Codebook-based UL transmission" 3GPP TSG RAN WG1 Meeting #90bis, R1-1717595, Prague, P.R. Czechia, Oct. 9-13, 2017, Agenda Item: 7.2.1.2, Source: Samsung, all pages.

"On Codebook Based UL Transmission" 3GPP TSG RAN WG1 Meeting AH 1801, R1-1800306, Vancouver, Canada, Jan. 22-26, 2018, Agenda Item: 7.2.1.2, Source: Intel Corporation, all pages.

* cited by examiner

INDICATION INFORMATION TRANSMISSION METHOD AND COMMUNICATION DEVICE

CROSS-REFERENCE TO RELATED APPLICATIONS

This application is the U.S. national phase of PCT Application No. PCT/CN2020/139190 filed on Dec. 25, 2020, which claims priorities of priority to the Chinese patent application No. 201911366591.3 filed on Dec. 26, 2019, the disclosures of which are incorporated herein by reference in their entireties.

TECHNICAL FIELD

The present disclosure relates to the field of communications technology, in particular to an indication information transmission method and a communication device.

BACKGROUND

In the wireless communication system in the related art, when the network side device indicates information to the terminal, the indicated information is wideband indication information, for example: the network side device indicates the wideband sounding reference signal (SRS) resource, the wideband transmission precoding matrix indicator (TPMI), and the wideband number of transmission layers indication information to the terminal. Since only the wideband indication information can be indicated, the flexibility of scheduling is relatively poor.

SUMMARY

Embodiments of the present disclosure provide an indication information transmission method and a communication device, so as to solve problem of poor scheduling flexibility.

An embodiment of the present disclosure provides an indication information transmission method, applied to a terminal and including: receiving an indication information, wherein the indication information includes one or more of the following: sounding reference signal (SRS) resource indication information, precoding matrix indication information, number of transmission layers indication information and antenna panel indication information; wherein at least one of the indication information included in the indication information is sub-band indication information.

Optionally, the SRS resource indication information included in the indication information is sub-band SRS resource indication information, and multiple sub-band SRS resource indication information indicate a same number of SRS resources.

Optionally, the SRS resource indication information included in the indication information is the sub-band SRS resource indication information, and the precoding matrix indication information included in the indication information is wideband precoding matrix indication information; or the SRS resource indication information included in the indication information is the wideband SRS resource indication information, and the precoding matrix indication information included in the indication information is the sub-band precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, and the number of transmission layers indication information included in the indication information is the wideband number of transmission layers indication information; or the SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information: the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band each sub-band indication information in the indication information corresponds to one sub-band, or the each sub-band each sub-band indication information in the indication information corresponds to a plurality of sub-bands.

Optionally, in the case that the SRS resource indication information included in the indication information is the sub-band SRS resource indication information, a number of SRS resource indication information included in the indication information is determined according to the configuration of a SRS resource set and/or a SRS resource for the uplink signal.

Optionally, the number of SRS resource indication information included in the indication information is a number of SRS resources included in the SRS resource set; or the number of SRS resource indication information included in the indication information is a number of SRS resource groups included in the SRS resource set, wherein spatial relation information of SRS resources of different SRS resource groups are different, and spatial relation information of SRS resources in a same SRS resource group is the same; or the number of the SRS resource indication information included in the indication information is a number of different spatial relation information included in the SRS resource set.

Optionally, the method further includes: determining a transmission parameter and/or a transmission antenna of an uplink signal according to the indication information; sending the uplink signal using the transmission parameter and/or the transmission antenna.

Optionally, the transmission parameter include at least one of the following: a precoding matrix, a number of transmission layers, spatial relation information or an SRS resource; the transmission antenna includes at least one of the following: a transmitting antenna or an antenna panel.

An embodiment of the present disclosure provides an indication information transmission method, applied to a network side device, and includes: transmitting an indication information, wherein the indication information includes one or more of the following: sounding reference signal (SRS) resource indication information, precoding matrix indication information, number of transmission layers indication information and antenna panel indication information; wherein at least one of the indication information included in the indication information is sub-band indication information.

Optionally, the SRS resource indication information included in the indication information is sub-band SRS resource indication information, and multiple sub-band SRS resource indication information indicate a same number of SRS resources.

Optionally, the SRS resource indication information included in the indication information is the sub-band SRS resource indication information, and the precoding matrix indication information included in the indication information is wideband precoding matrix indication information; or the SRS resource indication information included in the indication information is the wideband SRS resource indication information, and the precoding matrix indication information included in the indication information is the sub-band precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, and the number of transmission layers indication information included in the indication information is the wideband number of transmission layers indication information; or the SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information: the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band, or the each sub-band indication information in the indication information corresponds to a plurality of sub-bands.

Optionally, in the case that the SRS resource indication information included in the indication information is the sub-band SRS resource indication information, a number of SRS resource indication information included in the indication information is determined according to the configuration of a SRS resource set and/or a SRS resource for the uplink signal.

Optionally, the number of SRS resource indication information included in the indication information is a number of SRS resources included in the SRS resource set; or the number of SRS resource indication information included in the indication information is a number of SRS resource groups included in the SRS resource set, wherein spatial relation information of SRS resources of different SRS resource groups are different, and spatial relation information of SRS resources in a same SRS resource group is the same; or the number of the SRS resource indication information included in the indication information is a number of different spatial relation information included in the SRS resource set.

An embodiment of the present disclosure provides a terminal, including: a receiving module, configured to receive an indication information, wherein the indication information includes one or more of the following: sounding reference signal (SRS) resource indication information, precoding matrix indication information, number of transmission layers indication information and antenna panel indication information; wherein at least one of the indication information included in the indication information is sub-band indication information.

Optionally, the SRS resource indication information included in the indication information is sub-band SRS resource indication information, and multiple sub-band SRS resource indication information indicate a same number of SRS resources.

Optionally, the SRS resource indication information included in the indication information is the sub-band SRS resource indication information, and the precoding matrix indication information included in the indication information is wideband precoding matrix indication information; or the SRS resource indication information included in the indication information is the wideband SRS resource indication information, and the precoding matrix indication information included in the indication information is the sub-band precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, and the number of transmission layers indication information included in the indication information is the wideband number of transmission layers indication information; or the SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information: the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band, or the each sub-band indication information in the indication information corresponds to a plurality of sub-bands.

Optionally, in the case that the SRS resource indication information included in the indication information is the sub-band SRS resource indication information, a number of SRS resource indication information included in the indication information is determined according to the configuration of a SRS resource set and/or a SRS resource for the uplink signal.

Optionally, the number of SRS resource indication information included in the indication information is a number of SRS resources included in the SRS resource set; or the number of SRS resource indication information included in the indication information is a number of SRS resource groups included in the SRS resource set, wherein spatial relation information of SRS resources of different SRS resource groups are different, and spatial relation information of SRS resources in a same SRS resource group is the same; or the number of the SRS resource indication information included in the indication information is a number of different spatial relation information included in the SRS resource set.

Optionally, the terminal further includes: a determination module, configured to determine a transmission parameter and/or a transmission antenna of an uplink signal according to the indication information; a sending module, configured to send the uplink signal by using the transmission parameter and/or the transmission antenna.

Optionally, the transmission parameter include at least one of the following: a precoding matrix, a number of transmission layers, spatial relation information or an SRS resource; the transmission antenna includes at least one of the following: a transmitting antenna or an antenna panel.

An embodiment of the present disclosure provides a network side device, including: a transmission module, configured to transmit an indication information, wherein the indication information includes one or more of the following: sounding reference signal (SRS) resource indication information, precoding matrix indication information, number of transmission layers indication information and antenna panel indication information.

Optionally, the SRS resource indication information included in the indication information is sub-band SRS resource indication information, and multiple sub-band SRS resource indication information indicate a same number of SRS resources.

Optionally, the SRS resource indication information included in the indication information is the sub-band SRS resource indication information, and the precoding matrix indication information included in the indication information is wideband precoding matrix indication information; or the SRS resource indication information included in the indication information is the wideband SRS resource indication information, and the precoding matrix indication information included in the indication information is the sub-band precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, and the number of transmission layers indication information included in the indication information is the wideband number of transmission layers indication information; or the SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information: the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band, or the each sub-band indication information in the indication information corresponds to a plurality of sub-bands.

Optionally, in the case that the SRS resource indication information included in the indication information is the sub-band SRS resource indication information, a number of SRS resource indication information included in the indication information is determined according to the configuration of a SRS resource set and/or a SRS resource for the uplink signal.

Optionally, the number of SRS resource indication information included in the indication information is a number of SRS resources included in the SRS resource set; or the number of SRS resource indication information included in the indication information is a number of SRS resource groups included in the SRS resource set, wherein spatial relation information of SRS resources of different SRS resource groups are different, and spatial relation information of SRS resources in a same SRS resource group is the same; or the number of the SRS resource indication information included in the indication information is a number of different spatial relation information included in the SRS resource set.

An embodiment of the present disclosure provides a terminal, including: a transceiver, a memory, a processor, and a program stored on the memory and executed by the processor, wherein the program is executed by the processor to make the transceiver receive an indication information, wherein the indication information includes one or more of the following: sounding reference signal (SRS) resource indication information, precoding matrix indication information, number of transmission layers indication information and antenna panel indication information; wherein at least one of the indication information included in the indication information is sub-band indication information.

Optionally, the SRS resource indication information included in the indication information is sub-band SRS resource indication information, and multiple sub-band SRS resource indication information indicate a same number of SRS resources.

Optionally, the SRS resource indication information included in the indication information is the sub-band SRS resource indication information, and the precoding matrix indication information included in the indication information is wideband precoding matrix indication information; or the SRS resource indication information included in the indication information is the wideband SRS resource indication information, and the precoding matrix indication information included in the indication information is the sub-band precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, and the number of transmission layers indication information included in the indication information is the wideband number of transmission layers indication information; or the SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information: the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band, or the each sub-band indication information in the indication information corresponds to a plurality of sub-bands.

Optionally, in the case that the SRS resource indication information included in the indication information is the sub-band SRS resource indication information, a number of SRS resource indication information included in the indication information is determined according to the configuration of a SRS resource set and/or a SRS resource for the uplink signal.

Optionally, the number of SRS resource indication information included in the indication information is a number of SRS resources included in the SRS resource set; or the number of SRS resource indication information included in the indication information is a number of SRS resource groups included in the SRS resource set, wherein spatial relation information of SRS resources of different SRS resource groups are different, and spatial relation information of SRS resources in a same SRS resource group is the same; or the number of the SRS resource indication information included in the indication information is a number of different spatial relation information included in the SRS resource set.

Optionally, the program is executed by the processor to implement the following steps: determining a transmission parameter and/or a transmission antenna of an uplink signal according to the indication information; sending the uplink signal by using the transmission parameter and/or the transmission antenna.

Optionally, the transmission parameter include at least one of the following: a precoding matrix, a number of transmission layers, spatial relation information or an SRS resource; the transmission antenna includes at least one of the following: a transmitting antenna or an antenna panel.

An embodiment of the present disclosure provides a network side device, including: a transceiver, a memory, a processor, and a program stored on the memory and executed by the processor, wherein the program is executed by the processor to make the transceiver transmit an indication information, and the indication information includes one or more of the following: sounding reference signal (SRS) resource indication information, precoding matrix indication information, number of transmission layers indication information and antenna panel indication information; wherein at least one of the indication information included in the indication information is sub-band indication information.

Optionally, the SRS resource indication information included in the indication information is sub-band SRS resource indication information, and multiple sub-band SRS resource indication information indicate a same number of SRS resources.

Optionally, the SRS resource indication information included in the indication information is the sub-band SRS resource indication information, and the precoding matrix indication information included in the indication information is wideband precoding matrix indication information; or the SRS resource indication information included in the indication information is the wideband SRS resource indication information, and the precoding matrix indication information included in the indication information is the sub-band precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, and the number of transmission layers indication information included in the indication information is the wideband number of transmission layers indication information; or the SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information: the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band, or the each sub-band indication information in the indication information corresponds to a plurality of sub-bands.

Optionally, in the case that the SRS resource indication information included in the indication information is the sub-band SRS resource indication information, a number of SRS resource indication information included in the indication information is determined according to the configuration of a SRS resource set and/or a SRS resource for the uplink signal.

Optionally, the number of SRS resource indication information included in the indication information is a number of SRS resources included in the SRS resource set; or the number of SRS resource indication information included in the indication information is a number of SRS resource groups included in the SRS resource set, wherein spatial relation information of SRS resources of different SRS resource groups are different, and spatial relation information of SRS resources in a same SRS resource group is the same; or the number of the SRS resource indication information included in the indication information is a number of different spatial relation information included in the SRS resource set.

An embodiment of the present disclosure provides a computer-readable storage medium storing a computer program, the computer program is executed by a processor to implement the steps of the indication information transmission method.

In an embodiment of the present disclosure, an indication information is transmitted, the indication information includes one or more of the following: sounding reference signal (SRS) resource indication information, precoding matrix indication information, number of transmission layers indication information and antenna panel indication information; at least one of the indication information included in the indication information is sub-band indication information. The sub-band indication information is transmitted so as to improve scheduling flexibility.

DETAILED DESCRIPTION

In order to make the technical problems, technical solutions and advantages to be solved by the present disclosure more clear, detailed description will be given below with reference to the accompanying drawings and specific embodiments.

Figure 1:
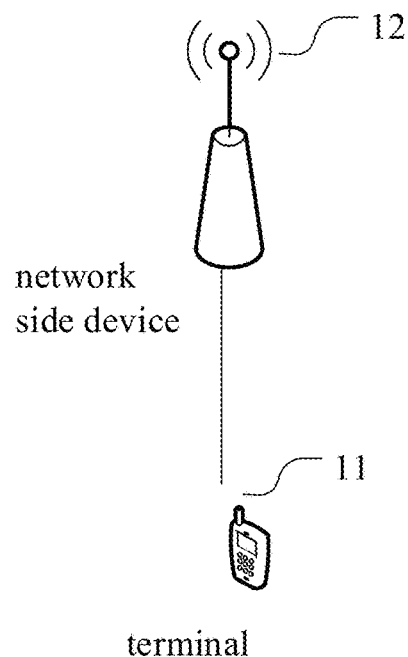
FIG. 1 is a schematic diagram of a network structure according to an embodiment of the present disclosure.

FIG. 1 is a schematic diagram of a network structure according to an embodiment of the present disclosure. As shown in FIG. 1, it includes a terminal 11 and a network side device 12. The terminal 11 may be a user equipment (UE) or other terminal device, for example: Mobile Phone, Tablet Personal Computer, Laptop Computer, Personal Digital Assistant (PDA), Mobile Internet Device (MID), Wearable Device, robots, vehicles and other terminal-side devices. It should be noted that the specific types of terminals are not limited in the embodiments of the present disclosure. The network side device 12 may be a base station, such as a macro station, a Long Term Evolution (LTE) base station (eNB), a fifth generation (5th Generation, 5G) New Radio (NR) base station (NB), etc.; the network side device may also be a small station, such as a low power node (LPN), a pico base station (pico), a femto base station (femto) and other small stations, or the network side device may be an access point (AP); the network side device may also be a central unit (CU), or may be a network node such as a transmission reception point (TRP). It should be noted that, the specific type of the network side device is not limited in the embodiments of the present disclosure.

In this embodiment of the present disclosure, the communication device may be a terminal or a network side device.

Figure 2:
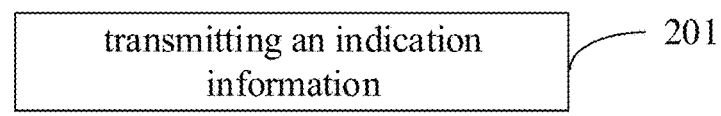
FIG. 2 is a flowchart of an indication information transmission method according to an embodiment of the present disclosure.

FIG. 2 is a flowchart of an indication information transmission method provided by an embodiment of the present disclosure. The method is applied to a communication device, as shown in FIG. 2, includes the following steps:

Step 201: Transmitting an indication information, wherein the indication information includes one or more of the following:

Sounding reference signal (SRS) resource indication information, precoding matrix indication information, number of transmission layers indication information and antenna panel indication information;

Wherein, at least one of the indication information included in the indication information is sub-band indication information.

Sub-band indication information indicates information of one or multiple sub-bands.

Wherein, in the case that the above-mentioned communication device is a terminal, step 201 may be to receive an indication information, and if the above-mentioned communication device is a network side device, step 201 may be to transmit the indication information.

The indication information is used for the terminal to determine a transmission parameter and/or a transmission antenna of an uplink signal according to the indication information; to further transmit the uplink signal by using the transmission parameter and/or the transmission antenna.

Optionally, the transmission parameter include at least one of the following:

A precoding matrix, a number of transmission layers, spatial relation information or an SRS resource;

The transmission antenna includes at least one of the following:

A transmitting antenna or an antenna panel.

In the embodiment of the present disclosure, the above indication information may be radio resource control (RRC) signaling, media access control (MAC) signaling, or downlink control information (DCI) signaling, or a combination of any two or more of the above RRC signaling, MAC signaling and DCI signaling. For example, the SRI resource indication information, the number of transmission layers indication information and the precoding matrix indication information are indicated in the same DCI; or, the SRI resource indication information and the number of transmission layers indication information are in one DCI, and the precoding matrix indication information is in another DCI or, a part of the precoding matrix indication information is in one DCI, and the other part thereof is in another DCI; or other combination schemes of the SRI resource indication information, the number of transmission layers indication information and the precoding matrix indication information, etc.

At least one indication information in the above-mentioned N indication information being sub-band indication information can be understood that one or more indication information of the N indication information included in the indication massage is the sub-band indication information, for example: the indication information includes SRS resource indication information, precoding matrix indication information, number of transmission layers indication information and antenna panel indication information, that is at least one of SRS resource indication information, precoding matrix indication information, number of transmission layers indication information and antenna panel indication information is the sub-band indication information. An indication information indicating that the indication information is of a sub-band means that the indication information contains an indication for the sub-band. It may be that the indication information is indicated for each sub-band, or one part of the indication information is indicated for the wideband (the entire uplink scheduling resource, or the entire BWP, or the entire uplink bandwidth, etc.), and the other part thereof is indicated for the sub-band. For example, the uplink transmission includes the sub-band TPMI of 3 sub-bands, TPMI can be indicated for each sub-band. For example, the TPMI indicates that the TPMI of the first sub-band is TPMI=0, and the TPMI of the second sub-band is TPMI=2, the TPMI of the third sub-band is TPMI=1. In another example, the TPMI includes a wideband part and a sub-band part, the wideband part is used to indicate the precoding matrix group, and the sub-band part is used to indicate a precoding matrix in the precoding matrix group corresponding to each sub-band.

It should be noted that, in this embodiment of the present disclosure, the SRS resource indication information may be referred to as an SRS resource indicator (SRI), and the precoding matrix indication information may be referred to as a transmission precoding matrix indicator (TPMI), and the number of transmission layers indication information can also be understood as transmission rank indicator (TRI). The SRS resource indication information may be used to indicate the SRS resource corresponding to the uplink signal transmission. For example, the uplink signal is PUSCH, for codebook-based PUSCH transmission, the SRS resource corresponding to the PUSCH transmission may be an SRS resource where the SRS ports and PUSCH ports are in a one-to-one corresponding manner. The SRS resource indicator may be indicated by the SRS resource indicator in the DCI, or the RRC signaling srs-ResourceIndicator, or the MAC-Control Element (CE) signaling. The precoding matrix indication information is used to indicate the precoding matrix corresponding to the uplink signal transmission. When the uplink signal is PUSCH, the precoding matrix indication information can be indicated by the precoding information and number of layers in the DCI, or the RRC signaling precodingAndNumberOfLayers, or the MAC-CE signaling. The number of transmission layers indication information is used to indicate the number of transmission layers during uplink signal transmission. When the uplink signal is PUSCH, the number of transmission layers indication information can be indicated by the precoding information and number of layers in the DCI, or the RRC signaling precodingAndNumberOfLayers, or the MAC-CE signaling.

Wherein, when a certain indication information is the sub-band indication information, the content indicated by the indication information is used for the corresponding sub-band. For example, the network side device schedules 3 sub-bands for the Physical uplink shared channel (PUSCH), and the above indication information includes the SRS resource indication information of the 3 sub-bands, and the SRS resource of each sub-band is a SRS resource indicated by the corresponding indication information.

In the embodiment of the present disclosure, through the above steps, the sub-band indication information can be obtained, thereby improving the flexibility of scheduling. For example, different resources can be scheduled for different sub-bands, or different antennas can be scheduled for transmission.

As an optional implementation, the SRS resource indication information included in the above indication information is the sub-band SRS resource indication information, and the multiple sub-band SRS resource indication information indicate a same number of SRS resources.

Wherein, the above-mentioned same number of resources refers to the number of SRS ports included in the SRS resources indicated by any two sub-band SRIs is the same. For example, the number of SRS ports included in the SRS resources indicated by any two sub-band SRIs is 1. Of course, this is not limited, for example, the number of SRS ports included in the SRS resources indicated by any two sub-band SRIs may be the same or different.

In addition, the above-mentioned same number of resources may refer to that the number of SRS resources indicated by any two sub-band SRIs is the same, for example, the number of SRS resources indicated by any two sub-band SRIs is 1.

Further, the above-mentioned indication information only includes SRS resource indication information, and the SRS resource indication information is of a sub-band, and the number of SRS resources indicated by any two sub-band SRIs is the same.

Optionally, this embodiment is only used when the transmission of the PUSCH is a codebook-based transmission scheme. Alternatively, this embodiment is only used when the PUSCH transmission is a codebook-based transmission scheme, and the number of antenna ports included in all SRS resources used for codebook-based uplink transmission is 1. Alternatively, this embodiment is only used when the transmission of the PUSCH is a non-codebook transmission scheme. Alternatively, this embodiment can be used regardless of whether the transmission scheme of the PUSCH is a codebook-based transmission scheme or a non-codebook transmission scheme.

Since in this embodiment, the SRS resource indication information included in the indication information is the sub-band SRS resource indication information, and the number of the SRS resources indicated by the multiple sub-band SRS resource indication information is the same, which may reduce the indication information required for the number of SRS resources to save the overhead of indicating information.

As an optional implementation, the SRS resource indication information included in the indication information is sub-band SRS resource indication information, and the precoding matrix indication information included in the indication information is wideband precoding matrix indication information; or The SRS resource indication information included in the indication information is wideband SRS resource indication information, and the precoding matrix indication information included in the indication information is the sub-band precoding matrix indication information; or The SRS resource indication information included in the indication information is the sub-band SRS resource indication information, and the precoding matrix indication information included in the indication information is the sub-band precoding matrix indication information; or The SRS resource indication information included in the indication information is the sub-band SRS resource indication information, and the number of transmission layers indication information included in the indication information is the wideband number of transmission layers indication information; or The SRS resource indication information included in the indication information is the wideband SRS resource indication information, and the number of transmission layers indication information included in the indication information is the sub-band number of transmission layers indication information.

Optionally, the precoding matrix indication information included in the indication information is indicated by a precoding matrix indication field of the indication information;

When the precoding matrix indication information included in the indication information is the wideband precoding matrix indication information, and the SRS resource indication information included in the indication information is the sub-band SRS resource indication information, one precoding matrix in the precoding matrix indication field indicates all SRS resource indication information corresponding to the indication information.

For example, the above-mentioned precoding matrix indication information is indicated by the TPMI field, and one TPMI value corresponds to all SRIs, which may save the overhead of indicating information.

In addition, in the above-mentioned case where the SRS resource indication information included in the indication information is the sub-band SRS resource indication information, the number of SRS ports included in the SRS resource of the SRS resource indication information of any two sub-bands is the same. Of course, this is not limited, for example, the number of SRS ports included in the SRS resources indicated by any two sub-band SRIs may be the same or different.

Optionally, numbers of transmission layers of an uplink signal on all sub-bands are the same. In this way, the overhead of transport stream indication information in the indication information can be reduced. For example, numbers of transmission layers of the PUSCH on all sub-bands are the same. Further, the above number of transport streams is determined according to the terminal capability and/or the signaling of the network side device, such as RRC signaling, MAC CE signaling or DCI, etc.

As an optional implementation, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or The SRS resource indication information included in the indication information is the wideband SRS resource indication information, the precoding matrix indication information included in the indication information is the sub-band precoding matrix indication information, and the number of transmission layers indication included in the indication information is the wildband number of transmission layers indication information; or The SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or The SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or The SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, the precoding matrix indication information and the number of transmission layers indication information included in the indication information are indicated by one indication field, and the indication field is a precoding matrix and number of transmission layers indication field;

When the precoding matrix indication information included in the indication information is the wideband precoding matrix indication information, and the number of transmission layers included in the indication information is the wideband number of transmission layers indication information, one precoding matrix and number of transmission layers of one indication field indicates all SRS resource indication information corresponding to the indication information.

For example, the precoding matrix indication information and the number of transmission layers indication information are indicated by the precoding matrix and number of transmission layers indication field, and the value indicated by one precoding matrix and number of transmission layers corresponds to all SRIs. It should be noted that the precoding matrix and number of transmission layers indication field refers to one field, rather than the precoding matrix indication field and the number of transmission layers indication field. Since the precoding matrix indication information and the number of transmission layers indication information are indicated by one field, so as to save the overhead of the indication information.

Optionally, the precoding matrix indication information included in the indication information is the wideband precoding matrix indication information, and the number of transmission layers indication information included in the indication information is the wideband number of transmission layers indication information, and when the precoding matrix indication information and the number of transmission layers indication information are the same, the precoding matrices of the uplink signal are different in sub-bands with different numbers of antenna ports indicated by the SRS resource indication information.

In this embodiment, under the same precoding matrix indication information and number of transmission layers indication information, if the number of antenna ports of the SRS resource indicated by the SRS resource indication information is different, the precoding matrix used for transmitting the uplink signal is different.

Optionally, when the SRS resource indication information included in the indication information is the sub-band SRS resource indication information, and the precoding matrix indication information included in the indication information is the sub-band precoding matrix indication information:

The indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

The predetermined corresponding relationship may be agreed with a protocol, and configured for the terminal by the network side device, for example, a one-to-one corresponding relationship, of course, this is not limited, a one-to-multiple corresponding relationship is also possible.

Further, the above-mentioned indication information may further include a plurality of SRS resource indication information and a plurality of precoding matrix indication information having a predetermined corresponding relationship.

As an optional implementation, the each sub-band indication information in the indication information corresponds to one sub-band: or The each sub-band indication information in the indication information corresponds to a plurality of sub-bands respectively.

Wherein, the sub-band indication information may be at least one of SRS resource indication information, precoding matrix indication information, number of transmission layers indication information and sub-band antenna panel indication information, for example: the SRS resource indication information in the above indication information is the sub-band SRS resource indication information, then each SRS resource indication information corresponds to one sub-band, that is, one sub-band SRI corresponds to one sub-band, or each SRS resource indication information corresponds to a plurality of sub-bands, that is, one sub-band SRI corresponds to the plurality of sub-bands. For example, if the precoding matrix indication information in the above indication information is the sub-band precoding matrix indication information, then each precoding matrix indication information corresponds to one sub-band, or each precoding matrix indication information corresponds to a plurality of sub-bands. For another example: the number of transmission layers indication information in the above indication information is the sub-band number of transmission layers indication information, then each number of transmission layers indication information corresponds to one sub-band, or each number of transmission layers indication information corresponds to a plurality of sub-bands.

Further, the above-mentioned sub-band may be a sub-band corresponding to the sub-band precoding matrix. In addition, the above-mentioned plurality of SRS resource indication information may be included in the SRI field in the uplink scheduling information, and the SRI field may be included in the DCI or in the RRC signaling.

As an optional implementation, in the case that the SRS resource indication information included in the indication information is the sub-band SRS resource indication information:

The number of SRS resource indication information included in the indication information is determined according to the SRS resource set and/or the SRS resource configuration used for the uplink signal.

The SRS resource set may be configured by a high-level signaling. For example, when the uplink signal is a PUSCH in a codebook-based transmission mode, the above-mentioned SRS resource set used for the uplink signal is the codebook-based ('codebook') SRS resource set configured by the high-level signaling usage, the SRS resource set used for the uplink signal is the SRS resource included in the codebook-based ('codebook') SRS resource set configured by the high-layer signaling usage.

Optionally, the number of SRS resource indication information included in the indication information is the number of SRS resources included in the SRS resource set; or The number of SRS resource indication information included in the indication information is the number of SRS resource groups included in the SRS resource set, wherein the spatial relation information of the SRS resources of different SRS resource groups are different, and the spatial relation information of the SRS resources in the same SRS resource group is the same; or The number of SRS resource indication information included in the indication information is the number of different spatial relation information included in the SRS resource set.

The spatial relation information is information used to determine spatial filtering, for example, the spatial relation information may be indication information used to indicate analog beams or spatial filtering parameters. For example, the spatial relation information may indicate a reference signal, and the terminal transmits the uplink signal by using a spatial filter that transmits or receives the reference signal, that is, the terminal can use the spatial relation information of the sub-band to determine the spatial filtering parameters of the sub-band for transmitting the uplink signal.

In addition, the spatial relation information of the SRS resources may be indicated by one or more of RRC signaling, MAC signaling, DCI signaling and other signaling.

The number of different spatial relation information included in the above-mentioned SRS resource set may be different spatial relation information corresponding to all SRS resources in the above-mentioned SRS resource set. For example: the above SRS resource set includes 5 SRS resources, wherein SRS resource 1 and SRS resource 2 are spatial relation information 1, SRS resource 3, SRS resource 4 and SRS resource 5 are spatial relation information 2, then the number of different spatial relation information included in the SRS resource set is 2.

Since the number of SRS resource indication information included in the indication information is the number of SRS resources included in the SRS resource set, each SRS resource can be indicated individually; and the number of SRS resource indication information included in the indication information is the number of SRS resource groups included in the SRS resource set, so that each SRS resource group is individually indicated to save the transmission overhead of the indication information; and the number of SRS resource indication information included in the indication information is the number of different spatial relation information included in the SRS resource set, the spatial relation information is used as an indication, so as to save the transmission overhead of the indication information.

As an optional implementation, in the case where the communication device is a terminal, the method further includes:

determining a transmission parameter and/or a transmission antenna of an uplink signal according to the indication information;

transmitting the uplink signal using the transmission parameter and/or the transmission antenna.

Optionally, the transmission parameter include at least one of the following:

A Precoding matrix, a number of transmission layers, spatial relation information or an SRS resource.

Optionally, the transmission antenna includes at least one of the following: a transmitting antenna or an antenna panel.

Wherein, the determining the transmission parameter and/or transmission antenna of the uplink signal according to the indication information may be determining the transmission parameter and/or transmission antenna of one or more sub-bands. For example: the indication information includes the sub-band SRS resource indication information and the wideband precoding matrix indication information, and the transmission parameter include the precoding matrix, the terminal can determine a precoding matrix of each PRB where the PUSCH is located according to the corresponding relationship between the indication information included in the indication information (for example: the sub-band SRS resource indication information and the wideband precoding matrix indication information) and a frequency domain resource allocated for the PUSCH, wherein the corresponding relationship between the indication information and the frequency domain resource can be preconfigured, or pre-agreed by the terminal and the network device, or pre-determined by the terminal according to a predetermined rule.

It should be noted that, in this embodiment of the present disclosure, the precoding matrix includes at least one of an analog beamforming matrix and a digital precoding matrix. Optionally, the analog beamforming matrix is determined according to the sub-band SRI, and the digital precoding matrix is determined according to the TPMI.

It should be noted that the indication information included in the indication information in the embodiment of the present disclosure does not limit the above-mentioned various optional implementation. For example, the indication information may also include the number of transmission layers indication information and the precoding matrix indication information, and may not include SRS resource indication SRI, wherein, the number of transmission layers indication information is of the wideband, and the precoding matrix indication information is of the sub-band; or, the indication information includes the number of transmission layers indication information and the precoding matrix indication information, and does not include SRS resource indication SRI, wherein both the number of transmission layers indication information and the precoding matrix indication information are of the sub-band.

It should also be noted that the various optional implementation provided above may be implemented in combination with each other, for example, the following implementation modes may be included:

Implementation mode 1: The indication information only includes SRS resource indication SRI information, where the SRI is of the sub-band, and numbers of SRS resources indicated by any two sub-band SRIs are the same.

Optionally, the SRS resources indicated by any two sub-band SRIs contain the same number of SRS ports. For example, the number of SRS ports included in the SRS resources indicated by any two sub-band SRIs is 1. Optionally, the number of SRS ports included in the SRS resources indicated by any two sub-band SRIs may be the same or different.

Optionally, the number of SRS resources indicated by any two sub-band SRIs is 1.

Optionally, this scheme may be adopted only when the transmission of the PUSCH is a codebook-based transmission scheme.

Optionally, this scheme can be used only when the transmission of the PUSCH is a codebook-based transmission scheme, and the number of antenna ports included in all SRS resources used for codebook-based uplink transmission is 1.

Optionally, this scheme may be used only when the transmission of the PUSCH is a non-codebook transmission scheme.

Optionally, this scheme can be adopted regardless of whether the transmission of the PUSCH is a codebook-based transmission scheme or a non-codebook transmission scheme.

Implementation mode 2: The indication information includes SRS resource indication SRI information and precoding matrix indication information, the SRI is of the sub-band, and the precoding matrix indication information is of the wideband.

Optionally, the precoding matrix indication information is indicated by a TPMI field, and one TPMI value corresponds to all SRIs.

Optionally, the SRS resources indicated by any two sub-band SRIs contain the same number of SRS ports. Optionally, the number of SRS ports included in the SRS resources indicated by any two sub-band SRIs may be the same or different.

Optionally, numbers of transmission layers of the PUSCH on all sub-bands are the same.

The number of transport streams may be determined according to the terminal capability and/or signaling of the network side device (the signaling may be RRC signaling, MAC CE signaling, or DCI, etc.).

The indication information may contain a plurality of SRI values, and each SRI value corresponds to one sub-band.

Optionally, the plurality of SRI values may be included in the SRI field in the uplink scheduling information, and the SRI field may be included in the DCI or in the RRC signaling.

Optionally, the transmission information indication information includes a plurality of SRI values, and each SRI value corresponds to one or more sub-bands.

The sub-band may be a sub-band corresponding to sub-band precoding.

The plurality of SRI values may be included in the SRI field in the uplink scheduling information, and the SRI field may be included in the DCI or in the RRC signaling.

Optionally, the corresponding relationship between the SRI and the sub-band is predefined. Optionally, the corresponding relationship between the SRI and the sub-band is indicated to the UE in advance by the network side device. Optionally, the transmission information indication information includes the corresponding relationship between the SRI and the sub-band.

Optionally, the precoding includes analog beamforming and digital precoding, wherein the analog beamforming is determined according to the sub-band SRI, and the digital precoding is determined according to the TPMI.

Optionally, all sub-bands have the same TPMI.

Optionally, the number of SRI values is equal to the number of sub-bands.

Optionally, the number of the SRI values is determined according to the SRS resource set for PUSCH and/or the configuration of the SRS resources.

For example, the number of the SRI values is equal to the number of SRS resources included in the SRS resource set for PUSCH. For example, the number of SRS resources included in the SRS resource set for the PUSCH is N, and the number of the SRI values is equal to N.

For example, the number of the SRI values is equal to the number of SRS resource groups with different spatial relation information in the SRS resource set for PUSCH. The SRS resources with the same spatial relation information are in one SRS resource group.

For example, the number of SRI values is equal to the number of different spatial relation information in the SRS resource set for PUSCH.

The spatial relation information may be information used to determine spatial filtering. The spatial relation information may be indicated by one or more of RRC signaling, MAC signaling, DCI signaling and other signaling.

Optionally, a bit width of one SRI value is determined according to the SRS resource set used for the PUSCH and/or the configuration of the SRS resources.

For example, the bit width of one sub-band SRI value is determined according to the number of SRS resources included in the SRS resource set for the PUSCH. For example, the number of SRS resources included in the SRS resource set for the PUSCH is N, and the bit width of one sub-band SRI value is $\lfloor \log_2 N \rfloor$.

For example, the bit width of one sub-band SRI value is determined according to the configuration of the spatial relation information of the SRS resources included in the SRS resource set for the PUSCH. For example, it is assumed that there are M configurations of different spatial relation information in the SRS resources included in the SRS resource set for the PUSCH, the maximum number of SRS resources with the same spatial relation information is K, and the bit width of one sub-band SRI value is $\lfloor \log_2 MK \rfloor$.

Further, the terminal may determine the precoding of each PRB where the PUSCH is located according to the corresponding relationship between the TPMI and the sub-band SRI and the frequency domain resources allocated for the PUSCH. Optionally, the precoding includes analog beamforming and digital precoding, wherein the analog beamforming is determined according to the sub-band SRI, and the digital precoding is determined according to the TPMI.

Implementation mode 3: The indication information includes SRS resource indication SRI information and precoding matrix indication information, where the SRI is of the wideband, and the precoding matrix indication information is of the sub-band.

The specific solution is similar to implementation mode 2, in which the SRI is replaced with a precoding matrix indicator, and the precoding matrix indicator is replaced with an SRI, which is not repeated here.

Implementation mode 4: The indication information includes SRS resource indication SRI information and precoding matrix indication information, where the SRI and precoding matrix indication information are both of the sub-band.

Optionally, the transmission information indication information includes a plurality of sub-band SRI indicators (that is, frequency selective SRI) and a plurality of sub-band TPMI indicators, and the plurality of sub-band TPMI indicators are in one-to-one correspondence with the plurality of sub-band SRI indicators. Each sub-band SRI indicator corresponds to one sub-band.

Optionally, the sub-band SRI and the sub-band TPMI have a corresponding relationship, and the corresponding relationship may be a one-to-multiple corresponding relationship.

Further, the terminal may determine the precoding of each PRB where the PUSCH is located according to the corresponding relationship between the sub-band TPMI and the sub-band SRI and the frequency domain resources allocated for the PUSCH.

Optionally, all the SRS resources indicated by the SRIs contain the same number of SRS ports. The TPMIs corresponding to all sub-bands are the same.

Optionally, the corresponding relationship is predefined (e.g., agreed by a protocol). Optionally, the corresponding relationship is indicated to the terminal by the network side device.

The specific solution is similar to implementation mode 2, in which the SRI is replaced with a precoding matrix indicator, and the precoding matrix indicator is replaced with the SRI, which is not repeated here.

Implementation mode 5: The indication information includes SRS resource indication SRI information, number of transmission layers indication information and precoding matrix indication information, the precoding matrix indication information and number of transmission layers indication information are of the wideband, and the SRI is of the sub-band.

Optionally, the precoding matrix indication information and the number of transmission layers indication information are indicated by the precoding matrix and number of transmission layers indication field, and the value of one precoding matrix and number of transmission layers indicator corresponds to all SRIs.

Optionally, the SRS resources indicated by any two sub-band SRIs contain the same number of SRS ports. Optionally, the number of SRS ports included in the SRS resources indicated by any two sub-band SRIs may be the same or different.

Optionally, the transmission information indication information includes a plurality of SRI values, and each SRI value corresponds to one sub-band. The above-mentioned sub-band may be a sub-band corresponding to sub-band precoding. The above-mentioned plurality of SRI values are included in the SRI field in the uplink scheduling information, and the SRI field may be included in the DCI, or may be included in the RRC signaling.

Optionally, the indication information includes a plurality SRI values, and each SRI value corresponds to one or more sub-bands. The above-mentioned sub-band is the sub-band corresponding to sub-band precoding. The above-mentioned plurality of SRI values are included in the SRI field in the uplink scheduling information, and the SRI field may be included in the DCI, or may be included in the RRC signaling.

Optionally, the corresponding relationship between the sub-band indication information included in the indication information and the sub-band may be predefined, for example: the corresponding relationship between the sub-band SRS resource indication information and the sub-band is predefined, and the corresponding relationship between the precoding matrix indication information and the sub-band is predefined, and the corresponding relationship between the sub-band number of transmission layers indication information and the sub-band is predefined.

Optionally, the corresponding relationship between the SRI and the sub-band is predefined. Optionally, the corresponding relationship between the SRI and the sub-band is indicated to the terminal in advance by the network side device. Optionally, the transmission information indication information includes the corresponding relationship between the SRI and the sub-band.

Optionally, the precoding includes analog beamforming and digital precoding, wherein the analog beamforming is determined according to the sub-band SRI, and the digital precoding is determined according to TPMI and TRI.

Wherein, the TPMI and TRI of all sub-bands are the same.

Optionally, under the same precoding matrix and the number of transmission layers indicator, the SRS resources indicated by the SRI contain different numbers of antenna ports, and the precoding matrices corresponding to uplink signal transmission are different.

Optionally, the number of SRI values is equal to the number of sub-bands.

Optionally, the number of the SRI values is determined according to the SRS resource set for PUSCH and/or the configuration of the SRS resources.

For example, the number of the SRI values is equal to the number of SRS resources included in the SRS resource set for PUSCH. For example, the number of SRS resources included in the SRS resource set for the PUSCH is N, and the number of the SRI values is equal to N.

For example, the number of the SRI values is equal to the number of SRS resource groups with different spatial relation information in the SRS resource set for PUSCH. The SRS resources with the same spatial relation information are in one SRS resource group.

For example, the number of SRI values is equal to the number of different spatial relation information in the SRS resource set for PUSCH.

The spatial relation information may be information used to determine spatial filtering. The spatial relation information may be indicated by one or more of RRC signaling, MAC signaling, DCI signaling and other signaling.

Optionally, the bit width of the SRS resource indication information included in the indication information is determined according to the SRS resource set used for the uplink signal and/or the configuration of the SRS resource. Further, the bit width of the SRS resource indication information included in the indication information is determined according to the number of SRS resources included in the SRS resource set used for the uplink signal; or, the bit width of the SRS resource indication information included in the indication information is determined according to the configuration of the spatial relation information of the SRS resources included in the SRS resource set used for the uplink signal.

For example, the uplink signal is a PUSCH, and the bit width of one SRI value is determined according to the SRS resource set for the PUSCH and/or the configuration of the SRS resources.

For example, the bit width of one sub-band SRI value is determined according to the number of SRS resources included in the SRS resource set for the PUSCH. For example, the number of SRS resources included in the SRS resource set for the PUSCH is N, and the bit width of one sub-band SRI value is $\lfloor \log_2 N \rfloor$.

For example, the bit width of one sub-band SRI value is determined according to the configuration of the spatial relation information of the SRS resources included in the SRS resource set for the PUSCH. For example, it is assumed that there are M configurations of different spatial relation information in the SRS resources included in the SRS resource set for the PUSCH, the maximum number of SRS resources with the same spatial relation information is K, and the bit width of the SRI value of one sub-band is $\lfloor \log_2 (MK) \rfloor$.

Further, the terminal may determine the precoding of each PRB where the PUSCH is located according to the precoding matrix indication information, the number of transmission layers indication information, and the corresponding relationship between the sub-band SRIs and the frequency domain resources allocated for the PUSCH. Optionally, the precoding includes analog beamforming and digital precoding, wherein the analog beamforming is determined according to the sub-band SRI, and the digital precoding is determined according to the precoding matrix indication information and the number of transmission layers indication information.

Implementation mode 6: The indication information includes SRS resource indication SRI information, number of transmission layers indication information and precoding matrix indication information, the SRI and number of transmission layers indication information are of the wideband, and the precoding matrix indication information is of the sub-band.

Optionally, the corresponding relationship between the precoding matrix indicator and the sub-band is predefined. Optionally, the corresponding relationship between the precoding matrix indicator and the sub-band is indicated to the terminal in advance by the network side device. Optionally, the transmission information indication information includes the corresponding relationship between the precoding matrix indicator and the sub-band.

Optionally, the SRI and the number of transmission layers indication information are jointly encoded and indicated by the same information field.

Optionally, the SRI and the number of transmission layers indication information are independently encoded and indicated by the same information field.

Optionally, the SRI and the number of transmission layers indication information are independently encoded and indicated by two different information fields.

The specific solution is similar to the previous implementation, and will not be repeated here.

Implementation mode 7: The indication information includes SRS resource indication SRI information, number of transmission layers indication information and precoding matrix indication information, the SRI is of the wideband, and the precoding matrix indication information and number of transmission layers indication information are of the sub-band.

Optionally, the corresponding relationship between the precoding matrix indicator and the sub-band is predefined. Optionally, the corresponding relationship between the precoding matrix indicator and the sub-band is indicated to the terminal in advance by the network side device. Optionally, the transmission information indication information includes the corresponding relationship between the precoding matrix indicator and the sub-band.

In addition, the corresponding relationship between the number of transmission layers indicator and the sub-band is predefined. Optionally, the corresponding relationship between the number of transmission layers indicator and the sub-band is indicated to the terminal in advance by the network side device. Optionally, the number of transmission layers indication information includes the corresponding relationship between the number of transmission layers indicator and the sub-band.

The specific solution is similar to the previous implementation, and will not be repeated here.

Implementation mode 8: The indication information includes SRS resource indication SRI information, number of transmission layers indication information and precoding matrix indication information, the number of transmission layers indication information is of the wideband, and the SRS resource indication SRI information and precoding matrix indication information is of the sub-band.

The specific solution is similar to the previous implementation, and will not be repeated here.

Implementation mode 9: The indication information includes SRS resource indication SRI information and precoding matrix indication information, where the SRI, the number of transmission layers indication information and the precoding matrix indication information are all of the sub-band.

The specific solution is similar to the previous implementation, and will not be repeated here.

Implementation mode 9: The indication information includes SRS resource indication SRI information and number of transmission layers indication information, the number of transmission layers indication information is of the wideband, and the SRS resource indication SRI information is of the sub-band.

It should be noted that, in the embodiment of the present disclosure, for different terminals, the network side device may adopt the above-mentioned different solutions. For the same terminal, the network side device may adopt one or more of the solutions. The network side device can indicate to the terminal which solution to adopt through signaling. In addition, the above only takes the uplink signal as the PUSCH for illustration. In the embodiment of the present disclosure, the uplink signal is not limited. For example, the uplink signal may also include: at least one of a demodulation reference signal (DMRS), a physical uplink control channel (PUCCH) signal, a physical random access channel (PRACH) signal, an SRS signal, and the like. The applicable systems in the embodiments of the present disclosure include, but are not limited to, the NR systems, the LTE system, the 6th Generation (6G) system, and the evolved versions thereof, and the like.

The indication information transmission method provided by the embodiment of the present disclosure will be illustrated by using a plurality of specific examples.

Example 1

The network side device configures the terminal to perform codebook-based PUSCH transmission. It is assumed that the corresponding SRS resource set includes two SRS resources: SRS resource 1 and SRS resource 2. The numbers of antenna ports included in these two SRS resources are 2 and 4 respectively. It is assumed that the precoding matrix indication information and the number of transmission layers indication information are of the wideband, and indicated by the same field precoding matrix and number of transmission layers indication information field, the SRI is of the sub-band, and one SRI corresponds to one sub-band. The transmission information indication information indicated by the network side device to the terminal includes a precoding matrix, number of transmission layers indication information and a plurality of SRIs. Assuming that the network side device schedules 3 sub-bands for the PUSCH, the SRI field contains 3 SRIs. Assuming that these three SRIs indicate SRS resource 1, SRS resource 2 and SRS resource 1 respectively, the precoding matrix and the number of transmission layers indication information indicate layer 1: TPMI index=0, then if the precoding matrix with 2 ports corresponding to the precoding matrix and the number of transmission layers indication information in the uplink codebook corresponding to the PUSCH transmission is $1/\sqrt{2}[1\ 0]^T$, and the precoding matrix with 4 ports is $\frac{1}{2}[1\ 0\ 0\ 0]^T$, then the terminal implements a single-stream transmission in all sub-bands, the precoding matrix of the sub-band corresponding to SRS resource 1 is $1/\sqrt{2}[1\ 0]^T$, and the precoding matrix of the sub-band corresponding to SRS resource 2 is $\frac{1}{2}[1\ 0\ 0\ 0]^T$.

Example 2

The network side device configures the terminal to perform codebook-based PUSCH transmission, assuming that the corresponding SRS resource set includes two SRS resources: SRS resource 1 and SRS resource 2, the number of antenna ports included in these two SRS resources is 2 and 4 respectively. It is assumed that the precoding matrix indication information is of the sub-band and indicated by the precoding matrix indication information field, the SRI and number of transmission layers indication information is of the wideband and indicated by different fields, and one precoding matrix indicator corresponds to one sub-band. The transmission information indication information indicated by the network side device to the terminal includes a plurality of precoding matrix indication information, one SRI and one number of transmission layers indicator. Assuming that the network side device schedules 3 sub-bands for the PUSCH, the precoding matrix indication information field contains a plurality of precoding matrix indicators. Assuming that the SRI indicates SRS resource 2, the number of transmission layers indication information indicates a single stream, and the TPMI indicator indicates: TPMI index=0, TPMI index=1, and TPMI index=0, then if the precoding matrix indication information TPMI index=0 and TPMI index=1 of single stream with 4 ports in the uplink codebook corresponding to the PUSCH transmission correspond to $\frac{1}{2}[1\ 0\ 0\ 0]^T$ and $\frac{1}{2}[0\ 1\ 0\ 0]^T$, then the precoding matrix corresponding to sub-bands 1 and 3 is $\frac{1}{2}[1\ 0\ 0\ 0]^T$, and the precoding matrix corresponding to sub-band 2 is $\frac{1}{2}[0\ 1\ 0\ 0]^T$.

Example 3

The network side device configures the terminal to perform non-codebook PUSCH transmission, assuming that the corresponding SRS resource set contains two SRS resources (SRS resource 1, SRS resource 2), and the number of SRS ports included in each SRS resource is 1. Assuming that the network side device schedules 3 sub-bands for the PUSCH, the transmission information indication information indicated by the network side device to the terminal includes 1 number of transmission layers indicator and 3 sub-band SRI indicators. Assuming that these 3 SRIs indicate SRS resource 1, SRS resource 2 and SRS resource 1, respectively, which correspond to sub-bands 1, 2, 3, then the terminal transmits PUSCH on sub-band 1 and sub-band 3 using the same antenna (and spatial filtering if possible) as SRS resource 1, and transmits PUSCH on sub-band 2 using the same antenna (and spatial filtering if possible) as SRS resource 2, In this embodiment of the present disclosure, a transmission indication information includes: SRS resource indication information, precoding matrix indication information, number of transmission layers indication information, and N indication information in antenna panel indication information, and at least one of the N indication information is sub-band indication information. In this way, the sub-band indication information can be transmitted, thereby improving the flexibility of scheduling.

Figure 3:
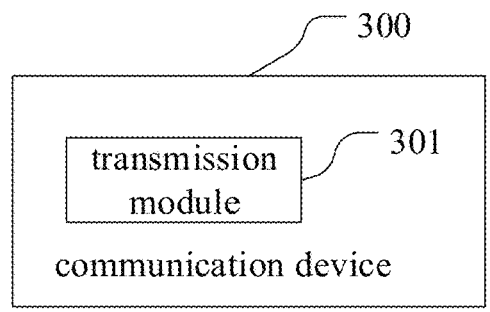
FIG. 3 is a structural diagram of a communication device according to an embodiment of the present disclosure.

FIG. 3 is a structural diagram of a communication device provided by an embodiment of the present disclosure. As shown in FIG. 3, the communication device 300 includes:

A transmission module 301, configured to transmit an indication information, wherein the indication information includes one or more of the following:

Sounding reference signal (SRS) resource indication information, precoding matrix indication information, number of transmission layers indication information and antenna panel indication information;

Wherein, at least one of the indication information included in the indication information is sub-band indication information.

Wherein, in the case that the above-mentioned communication device is a terminal, the transmission module 301 may receive the indication information, and if the above-mentioned communication device is a network side device, the transmission module 301 may transmit the indication information.

Optionally, the SRS resource indication information included in the above indication information is the sub-band SRS resource indication information, and the multiple sub-band SRS resource indication information indicate a same number of SRS resources.

Optionally, the SRS resource indication information included in the indication information is sub-band SRS resource indication information, and the precoding matrix indication information included in the indication information is wideband precoding matrix indication information; or The SRS resource indication information included in the indication information is wideband SRS resource indication information, and the precoding matrix indication information included in the indication information is the sub-band precoding matrix indication information; or The SRS resource indication information included in the indication information is the sub-band SRS resource indication information, and the precoding matrix indication information included in the indication information is the sub-band precoding matrix indication information; or The SRS resource indication information included in the indication information is the sub-band SRS resource indication information, and the number of transmission layers indication information included in the indication information is the wideband number of transmission layers indication information; or The SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or The SRS resource indication information included in the indication information is the wideband SRS resource indication information, the precoding matrix indication information included in the indication information is the sub-band precoding matrix indication information, and the number of transmission layers indication included in the indication information is the wideband number of transmission layers indication information; or The SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or The SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or The SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information:

The indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band: or The each sub-band indication information in the indication information corresponds to a plurality of sub-bands respectively.

Optionally, in the case that the SRS resource indication information included in the indication information is the sub-band SRS resource indication information:

The number of SRS resource indication information included in the indication information is determined according to the SRS resource set and/or the SRS resource configuration used for the uplink signal.

Optionally, the number of SRS resource indication information included in the indication information is the number of SRS resources included in the SRS resource set; or The number of SRS resource indication information included in the indication information is the number of SRS resource groups included in the SRS resource set, wherein the spatial relation information of the SRS resources of different SRS resource groups are different, and the spatial relation information of the SRS resources in the same SRS resource group is the same; or The number of SRS resource indication information included in the indication information is the number of different spatial relation information included in the SRS resource set.

Figure 4:
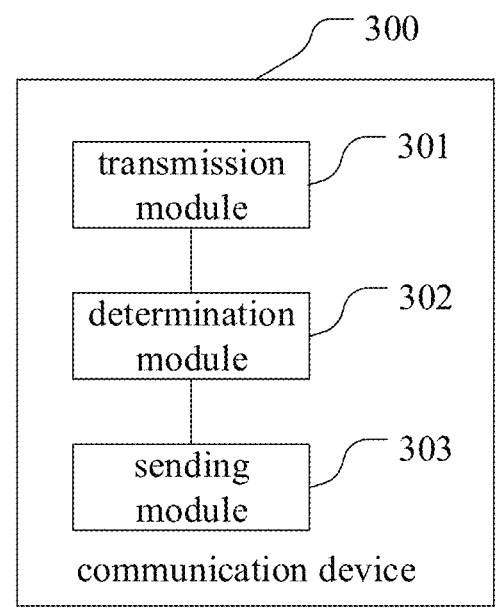
FIG. 4 is another structural diagram of a communication device according to an embodiment of the present disclosure.

Optionally, in the case that the communication device is a terminal, as shown in FIG. 4, the communication device 300 further includes:

a determination module 302, configured to determine a transmission parameter and/or a transmission antenna of an uplink signal according to the indication information;

a sending module 303, configured to send the uplink signal using the transmission parameter and/or the transmission antenna.

Optionally, the transmission parameter include at least one of the following:

A Precoding matrix, a number of transmission layers, spatial relation information or an SRS resource;

The transmission antenna includes at least one of the following:

a transmitting antenna or an antenna panel.

It should be noted that the above-mentioned communication device 300 in this embodiment may be a communication device of any implementation mode in the method embodiment of the present disclosure, and any implementation mode of the communication device in the method embodiment of the present disclosure may be used by this disclosure. The above-mentioned communication device 300 in the embodiment achieves the same beneficial effects, which will not be repeated here.

Figure 5:
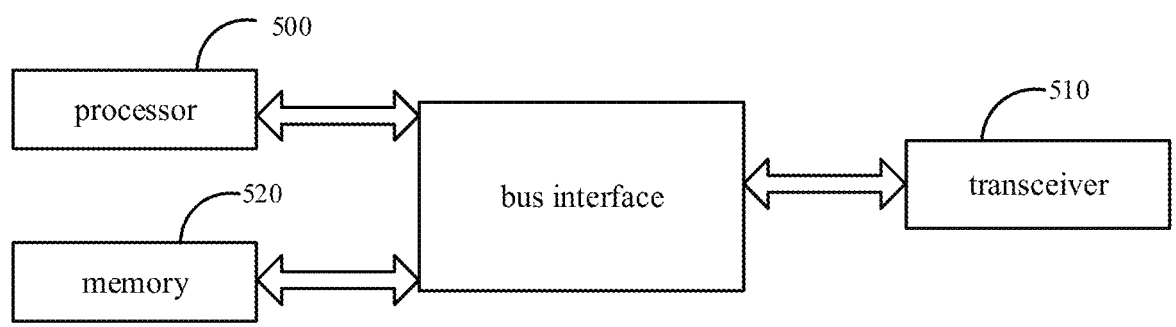
FIG. 5 is yet another structural diagram of a communication device according to an embodiment of the present disclosure.

FIG. 5 is a structural diagram of another communication device provided by an embodiment of the present disclosure. As shown in FIG. 5, the communication device includes: a transceiver 510, a memory 520, a processor 500, and a program stored on the memory 520 and executable by the processor 500, wherein:

The transceiver 510 is configured to transmit an indication information, wherein the indication information includes one or more of the following:

Sounding reference signal (SRS) resource indication information, precoding matrix indication information, number of transmission layers indication information and antenna panel indication information;

Wherein, at least one of the indication information included in the indication information is sub-band indication information.

The transceiver 510 may be used to receive and transmit data under the control of the processor 500.

In FIG. 5, the bus architecture may include any number of interconnected buses and bridges, in particular linking various circuits of one or more processors represented by processor 500 and memory represented by memory 520 together. The bus architecture may also link together various other circuits, such as peripherals, voltage regulators, and power management circuits, which are well known in the art and, therefore, will not be described further herein. The bus interface provides the interface. Transceiver 510 may be multiple elements, i.e., including a transmitter and a receiver, providing a unit for communicating with various other devices over a transmission medium.

The processor 500 is responsible for managing the bus architecture and general processing, and the memory 520 may store data used by the processor 500 during performing operations.

It should be noted that, the memory 520 is not limited to the communication device, and the memory 520 and the processor 500 may be separated and located in different geographical locations.

Optionally, the SRS resource indication information included in the above indication information is the sub-band SRS resource indication information, and the multiple sub-band SRS resource indication information indicate a same number of SRS resources.

Optionally, the SRS resource indication information included in the indication information is sub-band SRS resource indication information, and the precoding matrix indication information included in the indication information is wideband precoding matrix indication information; or The SRS resource indication information included in the indication information is wideband SRS resource indication information, and the precoding matrix indication information included in the indication information is the sub-band precoding matrix indication information; or The SRS resource indication information included in the indication information is the sub-band SRS resource indication information, and the precoding matrix indication information included in the indication information is the sub-band precoding matrix indication information; or The SRS resource indication information included in the indication information is the sub-band SRS resource indication information, and the number of transmission layers indication information included in the indication information is the wideband number of transmission layers indication information; or The SRS resource indication information included in the indication information is the wideband SRS resource indication information, and the number of transmission layers indication information included in the indication information is the sub-band number of transmission layers indication information.

Optionally, numbers of transmission layers of an uplink signal on all sub-bands are the same.

Optionally, the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or The SRS resource indication information included in the indication information is the wideband SRS resource indication information, the precoding matrix indication information included in the indication information is the sub-band precoding matrix indication information, and the number of transmission layers indication information included in the indication information is the wideband number of transmission layers indication information; or The SRS resource indication information included in the indication information is the wideband SRS resource indication information, the precoding matrix indication information included in the indication information is the sub-band precoding matrix indication information, and the number of transmission layers indication information included in the indication information is the sub-band number of transmission layers indication information; or The SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or The SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information.

Optionally, when the SRS resource indication information included in the indication information is the sub-band SRS resource indication information, and the precoding matrix indication information included in the indication information is the sub-band precoding matrix indication information:

The indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

Optionally, the each sub-band indication information in the indication information corresponds to one sub-band: or The each sub-band indication information in the indication information corresponds to a plurality of sub-bands respectively.

Optionally, in the case that the SRS resource indication information included in the indication information is the sub-band SRS resource indication information:

The number of SRS resource indication information included in the indication information is determined according to the SRS resource set and/or the SRS resource configuration used for the uplink signal.

Optionally, the number of SRS resource indication information included in the indication information is the number of SRS resources included in the SRS resource set; or The number of SRS resource indication information included in the indication information is the number of SRS resource groups included in the SRS resource set, wherein the spatial relation information of the SRS resources of different SRS resource groups are different, and the spatial relation information of the SRS resources in the same SRS resource group is the same; or The number of SRS resource indication information included in the indication information is the number of different spatial relation information included in the SRS resource set.

Optionally, in the case where the communication device is a terminal, the processor 500 or the transceiver 510 is further configured to: determine a transmission parameter and/or a transmission antenna of an uplink signal according to the indication information;

The transceiver 510 is configured to send the uplink signal using the transmission parameter and/or the transmission antenna.

Optionally, the transmission parameter include at least one of the following:

A Precoding matrix, a number of transmission layers, spatial relation information or an SRS resource;

The transmission antenna includes at least one of the following:

a transmitting antenna or an antenna panel.

It should be noted that the above-mentioned communication device in this embodiment may be a communication device of any implementation mode in the method embodiment of the present disclosure, and any implementation mode of the communication device in the method embodiment of the present disclosure may be used in this embodiment The above-mentioned communication device achieves the same beneficial effects, which will not be repeated here.

Embodiments of the present disclosure also provide a computer-readable storage medium, on which a computer program is stored, and when the program is executed by a processor, implements the steps in the indication information transmission method provided by the embodiments of the present disclosure.

In the several embodiments provided in the present disclosure, it should be understood that the disclosed method and device may be implemented in other manners. For example, the device embodiments described above are only illustrative. For example, the division of the units is only a logical function division. In actual implementation, there may be other division methods. For example, multiple units or components may be combined or integrated into another system, or some features can be ignored, or not implemented. On the other hand, the mutual coupling or direct coupling or communication connection may be through some interfaces, indirect coupling or communication connection of devices or units, and may be in electrical, mechanical or other forms.

In addition, each functional unit in each embodiment of the present disclosure may be integrated into one processing unit, or may be physically included individually, or two or more units may be integrated into one unit. The above-mentioned integrated unit may be implemented in the form of hardware, or may be implemented in the form of hardware and software functional units.

The above-mentioned integrated units implemented in the form of software functional units can be stored in a computer-readable storage medium. The above-mentioned software functional unit is stored in a storage medium, and includes several indications to enable a computer device (which may be a personal computer, a server, or a network device, etc.) to execute steps of the method. The aforementioned storage medium includes: U disk, mobile hard disk, read-only memory (ROM), random access memory (RAM), magnetic disk or optical disk and other media that can store program codes.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Those of ordinary skill in the art may implement the described function using different methods for each particular application, but such implementations should not be considered beyond the scope of this disclosure.

Those skilled in the art can clearly understand that, for the convenience and brevity of description, the specific working process of the system, device and unit described above may refer to the corresponding process in the foregoing method embodiments, which will not be repeated here.

Those of ordinary skill in the art can understand that all or part of the processes in the methods of the above embodiments can be accomplished by controlling the relevant hardware through a computer program, and the program can be stored in a computer-readable storage medium, and the program is executed, it may include the processes of the embodiments of the above-mentioned methods. The storage medium may be a magnetic disk, an optical disk, a read-only memory (ROM), or a random access memory (RAM) or the like.

It can be understood that the embodiments of the present disclosure may be implemented by hardware, software, firmware, middleware, microcode, or a combination thereof. For hardware implementation, modules, units and sub-units can be implemented in one or more Application Specific Integrated Circuits (ASIC), Digital Signal Processor (DSP), Digital Signal Processing Device (DSP Device, DSPD), Programmable Logic Device (PLD), Field-Programmable Gate Array (FPGA), general-purpose processor, controller, microcontroller, microprocessor, other electronic units or combinations thereof.

For software implementation, the techniques described in the embodiments of the present disclosure may be implemented through modules (e.g., procedures, functions, etc.) that perform the functions described in the embodiments of the present disclosure. Software codes may be stored in memory and executed by a processor. The memory can be implemented in the processor or external to the processor.

The above are optional embodiments of the present disclosure, and it should be pointed out that for those skilled in the art, several improvements and modifications can be made without departing from the principles described in the present disclosure, and these improvements and modifications are also within the scope of this disclosure.

What is claimed is:

1. An indication information transmission method, applied to a terminal, comprising:
   receiving an indication information, wherein the indication information comprises sounding reference signal (SRS) resource indication information, and the indication information further comprises one or more of precoding matrix indication information, or number of transmission layers indication information;
   wherein at least one of the indication information included in the indication information is sub-band indication information;
   wherein the SRS resource indication information included in the indication information is the sub-band SRS resource indication information, and the precoding matrix indication information included in the indication information is wideband precoding matrix indication information; or
   the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information; and numbers of SRS ports included in the SRS resources indicated by any two sub-band SRIs are the same; and wherein a number of SRS resource indication information included in the indication information is a number of SRS resources included in a SRS resource set; or a number of SRS resource indication information included in the indication information is a number of SRS resource groups included in a SRS resource set, wherein spatial relation information of SRS resources of different SRS resource groups are different, and spatial relation information of SRS resources in a same SRS resource group is the same; or a number of the SRS resource indication information included in the indication information is a number of different spatial relation information included in a SRS resource set.

2. The method according to claim 1, wherein numbers of transmission layers of an uplink signal on all sub-bands are the same.

3. The method according to claim 1, wherein in the case that the SRS resource indication information included in the indication information is the sub-band SRS resource indication information, and the precoding matrix indication information included in the indication information is the sub-band precoding matrix indication information:

the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

4. The method according to claim 1, wherein each sub-band each sub-band indication information in the indication information corresponds to one sub-band, or the each sub-band indication information in the indication information corresponds to a plurality of sub-bands.

5. The method according to claim 1, further comprising:

determining a transmission parameter and/or a transmission antenna of the uplink signal according to the indication information;

sending the uplink signal using the transmission parameter and/or the transmission antenna.

6. The method according to claim 5, wherein the transmission parameter include at least one of the following:

a precoding matrix, a number of transmission layers, spatial relation information or an SRS resource;

the transmission antenna includes at least one of the following:

a transmitting antenna or an antenna panel.

7. An indication information transmission method, applied to a network side device, comprising:

transmitting an indication information, wherein the indication information comprises sounding reference signal (SRS) resource indication information, and the indication information further comprises one or more of precoding matrix indication information, or number of transmission layers indication information;

wherein at least one of the indication information included in the indication information is sub-band indication information;

wherein the SRS resource indication information included in the indication information is the sub-band SRS resource indication information, and the precoding matrix indication information included in the indication information is wideband precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information; and numbers of SRS ports included in the SRS resources indicated by any two sub-band SRIs are the same; and wherein a number of SRS resource indication information included in the indication information is a number of SRS resources included in a SRS resource set; or a number of SRS resource indication information included in the indication information is a number of SRS resource groups included in a SRS resource set, wherein spatial relation information of SRS resources of different SRS resource groups are different, and spatial relation information of SRS resources in a same SRS resource group is the same; or a number of the SRS resource indication information included in the indication information is a number of different spatial relation information included in a SRS resource set.

8. The method according to claim 7, wherein numbers of transmission layers of an uplink signal on all sub-bands are the same.

9. The method according to claim 7, wherein in the case that the SRS resource indication information included in the indication information is the sub-band SRS resource indication information, and the precoding matrix indication information included in the indication information is the sub-band precoding matrix indication information:
the indication information includes a plurality of SRS resource indication information and a plurality of precoding matrix indication information, and the plurality of SRS resource indication information and the plurality of precoding matrix indication information have a predetermined corresponding relationship, and different SRS resource indication information correspond to different sub-bands.

10. The method according to claim 7, wherein the each sub-band indication information in the indication information corresponds to one sub-band, or
the each sub-band indication information in the indication information corresponds to a plurality of sub-bands.

11. A network side device, comprising: a transceiver, a memory, a processor, and a program stored on the memory and executed by the processor, wherein the program is executed by the processor to implement the indication message transmission method according to claim 7.

12. A terminal, comprising: a transceiver, a memory, a processor, and a program stored on the memory and executed by the processor, wherein the program is executed by the processor to make the transceiver receive an indication information, wherein the indication information comprises sounding reference signal (SRS) resource indication information, and the indication information further comprises one or more of precoding matrix indication information, or number of transmission layers indication information;
wherein at least one of the indication information included in the indication information is sub-band indication information;
wherein the SRS resource indication information included in the indication information is the sub-band SRS resource indication information, and the precoding matrix indication information included in the indication information is wideband precoding matrix indication information; or the SRS resource indication information included in the indication information is the sub-band SRS resource indication information, and the precoding matrix indication information included in the indication information is the sub-band precoding matrix indication information; or the SRS resource indication information included in the indication information is the sub-band SRS resource indication information, the precoding matrix indication information included in the indication information is the wideband precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the wideband number of transmission layers indication information; or the SRS resource indication information included in the indication information is the sub-band SRS resource indication information, the precoding matrix indication information included in the indication information is the sub-band precoding matrix indication information, and the number of transmission layers indication information included in the indication information is the sub-band number of transmission layers indication information; and numbers of SRS ports included in the SRS resources indicated by any two sub-band SRIs are the same; and wherein a number of SRS resource indication information included in the indication information is a number of SRS resources included in a SRS resource set; or a number of SRS resource indication information included in the indication information is a number of SRS resource groups included in a SRS resource set, wherein spatial relation information of SRS resources of different SRS resource groups are different, and spatial relation information of SRS resources in a same SRS resource group is the same; or a number of the SRS resource indication information included in the indication information is a number of different spatial relation information included in a SRS resource set.

* * * * *